US008863306B2

(12) United States Patent
Greevenbosch et al.

(10) Patent No.: US 8,863,306 B2
(45) Date of Patent: Oct. 14, 2014

(54) DEVICE AND METHOD FOR DIGITAL RIGHTS MANAGEMENT (75) Inventors: Bert Greevenbosch, Erlangen (DE); Stefan Kraegeloh, Erlangen (DE); Harald Fuchs, Roettenbach (DE); Mercè Serra Joan, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 704 days.

(21) Appl. No.: 12/667,250

(22) PCT Filed: Jul. 3, 2008

(86) PCT No.: PCT/EP2008/005448
§ 371 (c)(1), (2), (4) Date: Feb. 11, 2010

(87) PCT Pub. No.: WO2009/003708
PCT Pub. Date: Jan. 8, 2009

(65) Prior Publication Data
US 2010/0212022 A1    Aug. 19, 2010

(51) Int. Cl.
*G06F 17/30* (2006.01)
*H04L 9/32* (2006.01)
*G06F 21/10* (2013.01)

(52) U.S. Cl.
CPC ..................... *G06F 21/10* (2013.01)
USPC ........................... 726/27; 713/178

(58) Field of Classification Search
CPC ............... G06F 21/10; G06F 21/6218; G11B 20/00086; H04L 2463/101; H04L 63/0428

USPC ........ 726/27, 20, 28, 31–33; 705/901, 51, 52, 705/54, 57; 713/167, 168, 178; 709/206
See application file for complete search history.

(56) References Cited

U.S. PATENT DOCUMENTS 6,292,892 B1   9/2001  Davis
7,185,195 B2   2/2007  Hug et al.
(Continued)

FOREIGN PATENT DOCUMENTS

JP    2006-504176 A    2/2006
JP    2006-065641 A    3/2006
(Continued)

OTHER PUBLICATIONS

Official Communication issued in International Patent Application No. PCT/EP2008/005448, mailed on Oct. 9, 2008.
(Continued)

*Primary Examiner* — Abu Sholeman
(74) *Attorney, Agent, or Firm* — Keating & Bennett, LLP (57) ABSTRACT

A digital rights management method includes: storing information on a rights object in a memory area, wherein the rights object has been transferred from a first device to a second device, and wherein the rights object includes permissions linked to a digital media object; receiving a rights object at the first device; and accessing the memory area to check whether information on the received rights object is stored in the memory area and to set up the received rights object on the first device in case the information on the received rights object is not stored in the memory area, and to reject the received rights object in case the information on the received rights object is stored in the memory area.

20 Claims, 4 Drawing Sheets

(56) References Cited

U.S. PATENT DOCUMENTS

| | | | |
|---|---|---|---|
| 7,191,332 B1 | 3/2007 | Pankajakshan et al. | |
| 2003/0074569 A1 | 4/2003 | Yamauchi et al. | |
| 2005/0080746 A1 | 4/2005 | Zhu et al. | |
| 2005/0210249 A1 | 9/2005 | Lee et al. | |
| 2006/0155727 A1* | 7/2006 | Kim et al. | 707/100 |
| 2007/0056042 A1 | 3/2007 | Qawami et al. | |
| 2007/0198434 A1* | 8/2007 | Jang et al. | 705/67 |
| 2007/0263869 A1* | 11/2007 | Oh et al. | 380/255 |
| 2008/0141368 A1* | 6/2008 | Mariana | 726/21 |

FOREIGN PATENT DOCUMENTS

| | | |
|---|---|---|
| RU | 2 147 790 C1 | 4/2000 |
| RU | 2 155 984 C1 | 9/2000 |
| TW | I256212 A | 6/2006 |
| TW | 200631374 A | 9/2006 |
| TW | I281825 A | 5/2007 |
| WO | 2004/038568 A2 | 5/2004 |
| WO | 2004/038568 A3 | 5/2004 |
| WO | WO 2006085029 * | 8/2006 |
| WO | 2007/036831 A2 | 4/2007 |
| WO | 2007/036831 A3 | 4/2007 |

OTHER PUBLICATIONS

Official Communication issued in corresponding Japanese Patent Application No. 2010-513789, mailed on Dec. 27, 2011.

* cited by examiner

DEVICE AND METHOD FOR DIGITAL RIGHTS MANAGEMENT

BACKGROUND OF THE INVENTION

The present invention generally relates to digital rights management and, more particularly, to a backup and transfer of digital rights.

Digital rights management (DRM) describes a concept by which media providers enforce limitations on usage and distribution of digital media content. Presently, there are number of DRM schemes in use. For example, mobile content providers use the Open Mobile Alliance (OMA) DRM system to protect digital mobile media content.

The OMA DRM family comprises digital rights management standards that are developed by the Open Mobile Alliance. To date, the OMA DRM family comprises:

OMA Digital Rights Management 1.0 (DRM v1.0),
OMA Digital Rights Management 2.0 (DRM v2.0),
OMA Digital Rights Management 2.1 (DRM v2.1),
OMA DRM v2.0 Extensions for Broadcast Support (XBS),
OMA Secure Removable Media (SRM),
OMA Secure Content Exchange (SCE).

The OMA DRM system enables content issuers to distribute DRM protected content and rights issuers (RIs) to issue rights objects (ROs) for the DRM protected content. The DRM system is independent of media object formats, operating systems, and run-time environments. Contents protected by DRM can be of a wide variety, including games, ring tones, photos, music clips, video clips, streaming media, etc. For a user consumption of the content, users acquire permission to DRM protected content by contacting rights issuers, i.e. an entity that issues rights objects to DRM conformant devices. Rights issuers grant appropriate permission for the DRM protected content to use it on DRM conformant devices. The content is cryptographically protected when distributed and, hence, will not be usable without an associated rights object (RO) issued for the users device.

DRM protected content can be delivered to the device by any means, for example, over the air, LAN/WLAN, local connectivity, removable media, etc. Rights objects, however, are tightly controlled and distributed by the rights issuer in a controlled manner. DRM protected content and rights objects may be delivered to the device together or separately.

Within the scope of the OMA DRM family, there is a fundamental difference between a backup of rights and a move of rights between devices.

The backup of rights comprises copying an OMA DRM v2.x rights object (RO) from a originating device to another medium. The copied rights object is called backup rights object. However, the backup rights object remains cryptographically bound to the originating device, such that it can only be restored or reinstalled to the originating device. A backup rights object cannot be used to exercise the rights on any other device than the originating device.

The backup of rights is possible from OMA DRM v2.0 onwards. The process of restoring or reinstalling a backup rights object and making it usable on the device is called installing a backup rights object.

On the other hand, the move of rights comprises moving or transferring a rights object between two devices, i.e. from an originating or source device to a sink device. Before the move takes place, the rights object is only cryptographically bound to the source device, i.e., only the source device can exercise the rights. After the move, the rights object is only bound to the sink device, i.e., only the sink device can exercise the respective rights.

In the OMA DRM family, some form of moving rights appears in DRM v2.1. There, a move of rights is possible by uploading a rights object to an OMA DRM rights issuer (RI) and downloading it to another device. In SRM, protocols for the move of rights between a device and a secure removable media are defined, i.e., a removable media that implements means to protect against unauthorized access to its internal data (e.g. secure memory card, smart card). In SCE, protocols for the move of rights between devices are specified.

In the OMA DRM family, there are two types of rights objects:
Stateful rights objects and
Stateless rights objects.

Stateful rights objects have a state that changes during an exercise of rights. For example, a rights object can allow a certain piece of content to be played three times. In this case, the state is the number of plays left. Stateless rights objects are rights objects that are not stateful. Both stateful and stateless rights objects can be bound to a single device, in which case they are called device rights objects, or to a group of devices belonging to the same user, in which case they are called domain rights objects.

In DRM v2.1, some protection mechanisms against replay of stateful rights objects are defined, which prevent an unauthorized extension of granted rights, for example, extending the number of plays originally granted to the device. Such protection mechanisms comprise keeping track of all received stateful rights objects in a local cache. Each entry of the local cache comprises a globally unique identification of the stateful rights object and a timestamp of the rights issuer (RI timestamp) for this rights object. A device will only install received stateful rights objects that are not already listed in the local cache memory (DRM v2.1, section 10.4). Additionally, stateful domain rights objects without a RI timestamp are kept in a separated local cache, which only keeps track of the unique identification of the rights object. DRM v2.1 defines yet another local cache to prevent the replay of stateless rights objects uploaded to a rights issuer. When a device uploads a stateless rights object to the rights issuer, a new entry with a unique identification of the rights object and the rights object timestamp is inserted in the cache.

In SRM, an attack of replaying a rights object that has been moved out from the device to the secure removable media has not been addressed yet.

A problem occurs when both move and backup for the same rights object are allowed. In particular, this holds for SRM. The following attack may be possible:
1. A user makes a backup of the rights object from the source device.
2. The user then moves the rights from the source device to the sink device.
3. Finally, the user restores the backup to the source device.

In this way, the user might duplicate the rights. This problem also applies for the replay of a rights object via an out-of-band delivery after the rights object has been moved from the source device.

Such an attack has been recognized in OMA. However, a suitable solution has not been identified yet although SRM speculates about not allowing move for a rights object of which a backup copy has been performed. This implies that the user may choose either if he may want to move the rights object sometime in the future or if he wants a safety backup. If he decides for a backup, the rights object in this case is bound to the source device forever. This would be a bad user experience, since the user is restricted in his rights although he only wants to store them in a safe place.

A similar problem appears for a backup of a stateful rights object. In this case, the following attack scenario is possible.
1. A user makes a backup of the stateful rights object.
2. The user consumes some of the rights (changing the state).
3. The user removes the rights object and accompanying state information from the device.
4. The user restores the backup rights object to the device.

As the state information has been deleted, the attacker can exercise the rights as they were before the state was changed.

Unnecessarily restricting the user in his rights, although he only wants to store a backup in a safe place, and not providing a solution to the above-mentioned problem could result in a bad user acceptance and, thus, to a commercial failure of OMA DRM systems.

Hence, it would be desirable to reduce the described inherent tension between protecting digital media content by related rights objects on the one hand and providing consumers with enough flexibility to manage the content they purchase in a reasonable way.

SUMMARY

Embodiments of the present invention are based on the finding that a high level of digital media content protection and user flexibility can be achieved by providing a DRM device with means for protocolling any moves of rights objects from said DRM device to another medium or DRM device. For this purpose, the DRM device may be equipped with a memory area for storing information related to rights objects that have been transferred from the DRM device to another medium. In case a user wants to install a rights object on the DRM device, information on this rights object is compared to the information stored in the memory area related to previously moved rights objects. In case this comparison yields that the rights object to be installed on the DRM device has previously been moved or transferred from the DRM device to somewhere else, the restoration or installation of said rights object is cancelled or rejected.

According to an embodiment, a digital rights management (DRM) device may have a memory area for storing information on a rights object that has been transferred from the DRM device to another DRM device, wherein the rights object comprises permission linked to a digital media object and a processor for receiving a rights object, wherein the processor is operative to access the memory area to check whether information on the received rights object is stored in the memory and to set up the received rights object on the DRM device in case the information on the received rights object is not stored in the memory area and to reject the received rights object in case the information on the received rights object is stored in the memory area.

According to a further embodiment, a digital rights management method may have the steps of storing information on a rights object in a memory area of a first device, wherein the rights object has been transferred from the first device to a second device, and wherein the rights object comprises permissions linked to a digital media object, receiving a rights object at the first device, and accessing the memory area to check whether information on the received rights object is stored in the memory area and to set up the received rights object on the first device in case the information on the received rights object is not stored in the memory area, and to reject the received rights object in case the information on the received rights object is stored in the memory area.

Another embodiment may have a computer program having a program code for performing a digital rights management method as mentioned above, when the computer program is running on a computer and/or a microcontroller.

The memory area for storing information on transferred rights objects may be a cache memory and will therefore be also referred to as move cache in the sequel. In order to prevent that the move cache requires a large amount of memory, the move cache may only keep a small amount of information on the rights object that uniquely identifies the rights object rather than the complete rights object. According to embodiments, this small amount of information may be a piece of a cryptographic hash over the complete rights object. Thereby, a size of the piece may be taken such that it is very improbable that two different rights objects lead to the same rights object hash or to the same piece of their associated rights object hashes.

According to embodiments, the move cache may be an unprotected memory area of the DRM device. However, a cryptographic hash over the (unprotected) move cache may reside in a protected memory area, such that a compromise of the move cache may be detected.

Of course, the size of the move cache is limited. In case the move cache exhausts, i.e., information on a plurality of rights objects exceeds the size of the move cache, embodiments of the present invention allow to store at least parts of said move cache in a further memory area or on another medium, which might comprise unprotected memory. In the sequel of this specification this storing of at least parts of the move cache will be referred to as export from the move cache. When an export from the move cache takes place, the local move cache in the DRM device may only keep a cryptographic hash over the part of the move cache that was exported and the point in time on which the export happened. This point in time, the so-called exported move cache timestamp, is also stored in the exported move cache according to an embodiment of the present invention.

In case a backup rights object is to be installed on the DRM device, the processor first checks if the backup rights object or information related thereto resides in the move cache. If so, the backup rights object is not installed on the DRM device. If the rights object or information related thereto is not in the move cache, but a related rights object timestamp indicates a time after a last export of the move cache, the rights object is accepted for installation or restoration on the DRM device. If the rights object's timestamp indicates a time before the last export of the move cache, the processor checks the exported move caches from a most recent one to older ones until the rights object or information related thereto is found or until a timestamp of the exported move cache indicates a time of the move cache export earlier than the rights object's timestamp. If the rights object is not found in any move caches, including the exported move caches, the backup rights object may be reinstalled or restored on the DRM device.

Embodiments of the present invention allow the use of both move and backup of rights in the OMA DRM family, but avoid the danger of duplicating said rights. This may increase user experience and user acceptance, since a backup of rights does not restrict the user's flexibility related to said rights.

The introduction of the move cache for storing the information on rights objects may also avoid an attack of replaying a stateless rights object to a DRM device by an out-of-band delivery after this stateless rights object has been moved from the DRM device e.g. to a secure removable media. This may prevent an unauthorized duplication of rights by an attacker.

Moreover, state information of rights objects comprised by the move cache may allow a user to backup stateful rights. Thus, a user may make a backup of any rights object, independent of it being stateless or stateful. This may make the backup operation consistent. A user does not need to understand why he may make a backup of certain rights objects whilst he cannot make a backup of other rights objects.

A possibility to export the move cache to an external storage medium may prevent a user of being unable to move rights due to a full internal move cache of the DRM device. The storage of a timestamp of an export of the move cache may prevent a user to be requested for exported memory data as much as possible.

A content issuer may benefit from embodiments of the present invention in that his interests in keeping contents safe is assured by the inventive concept, but a user has a more flexible use of the content. Due to the reduced restrictions, a user is more likely to buy protected content such that the content issuer sales are increased.

Other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention are described in the following with reference to the accompanying drawings, in which.

DETAILED DESCRIPTION OF THE INVENTION

Figure 1A:
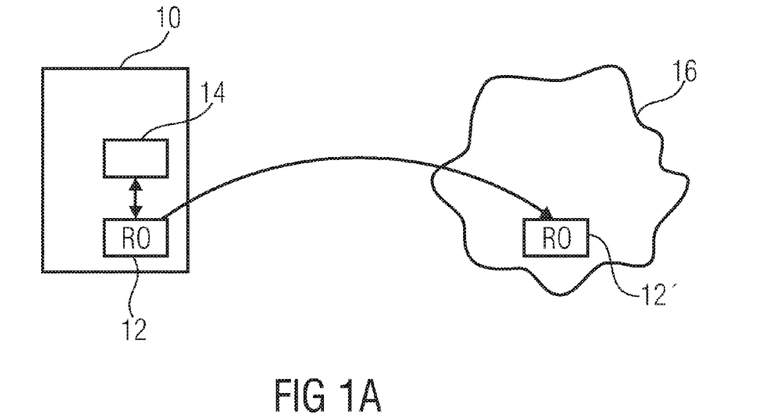
FIG. 1a-c show principle steps of an attack scenario, which can be avoided by embodiments of the present invention.
Figure 1B:
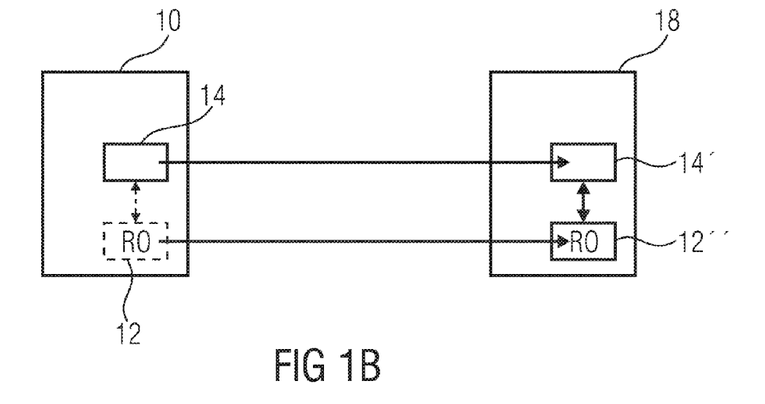
Figure 1C:
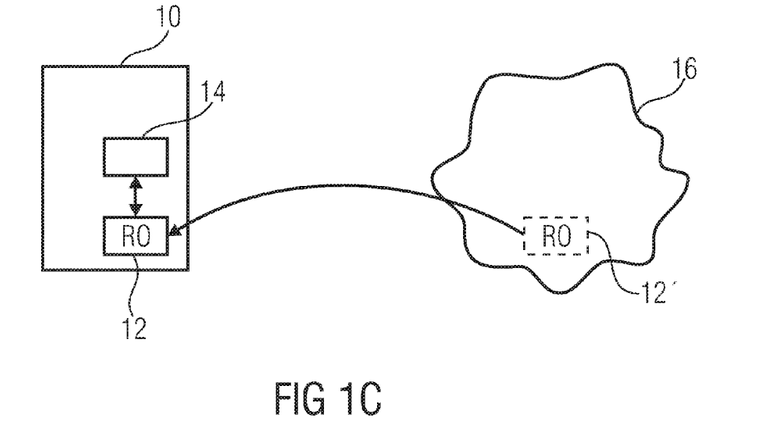
Figure 2:
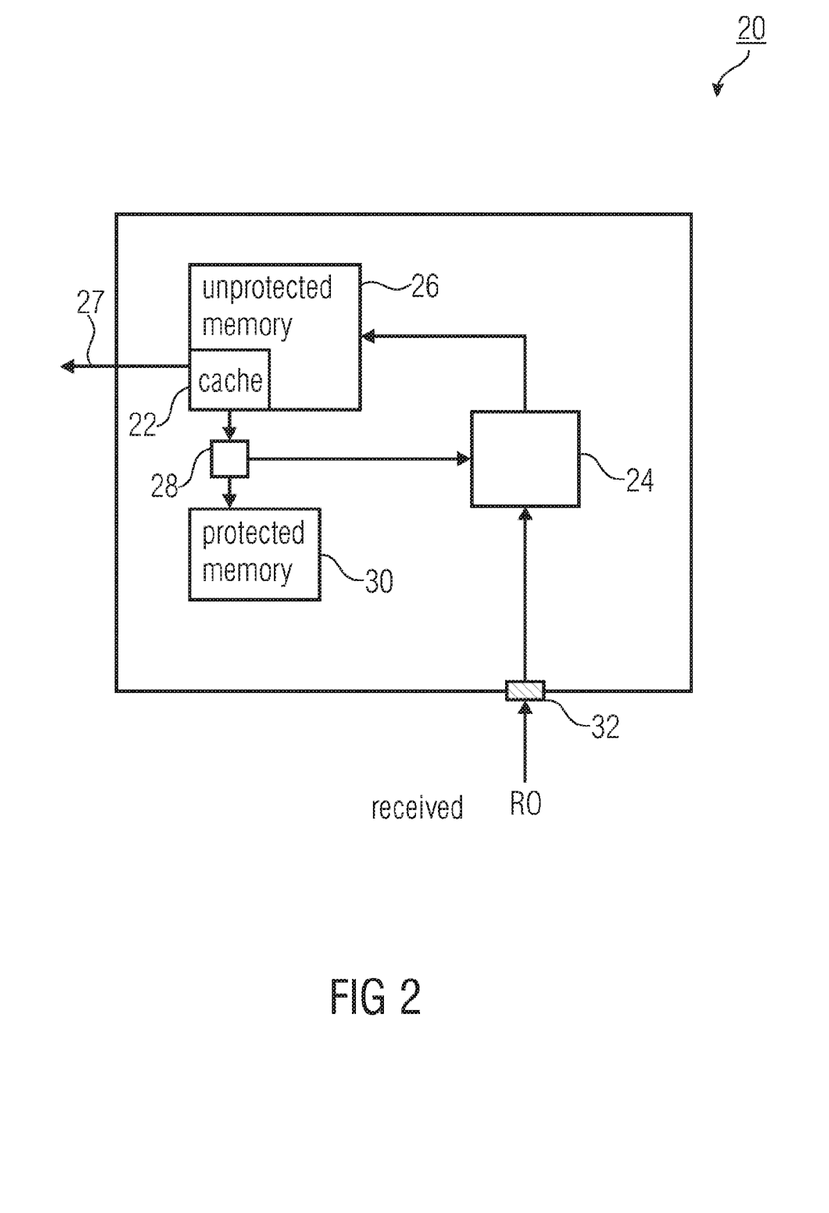
FIG. 2 shows a schematic block diagram of a DRM device according to an embodiment of the present invention.
Figure 3:
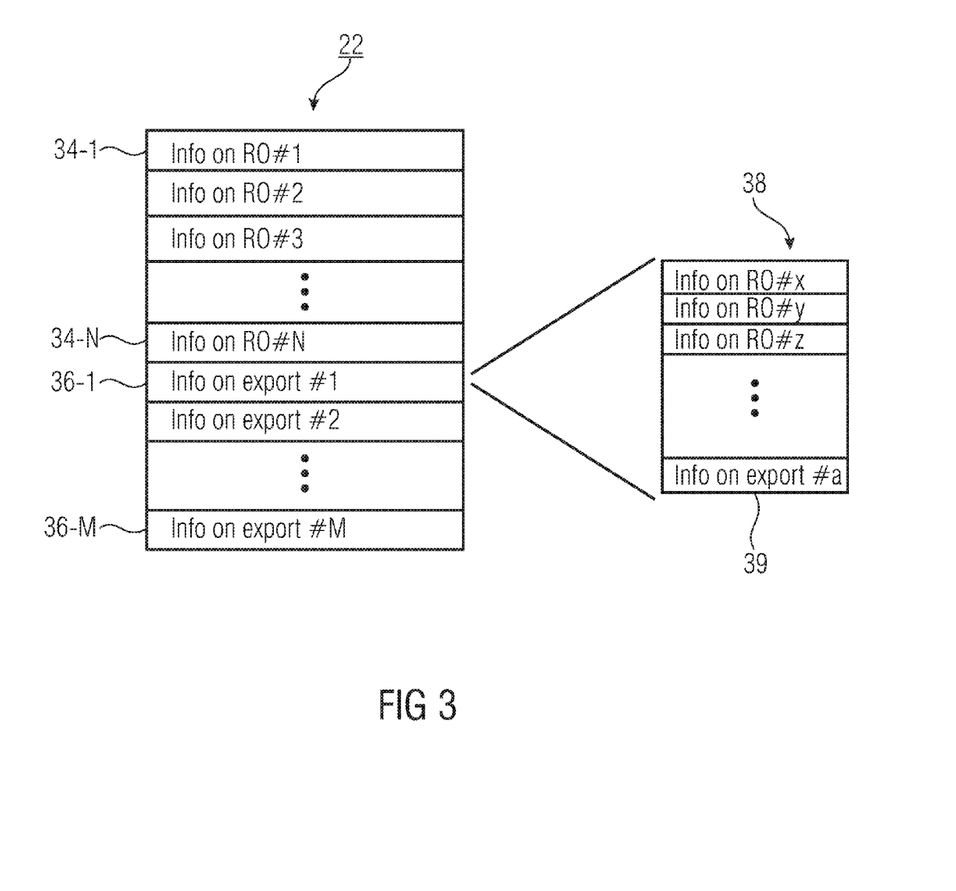
FIG. 3 shows a principle structure of a memory area (move cache) for storing information on rights object according to an embodiment of the present invention.
Figure 4:
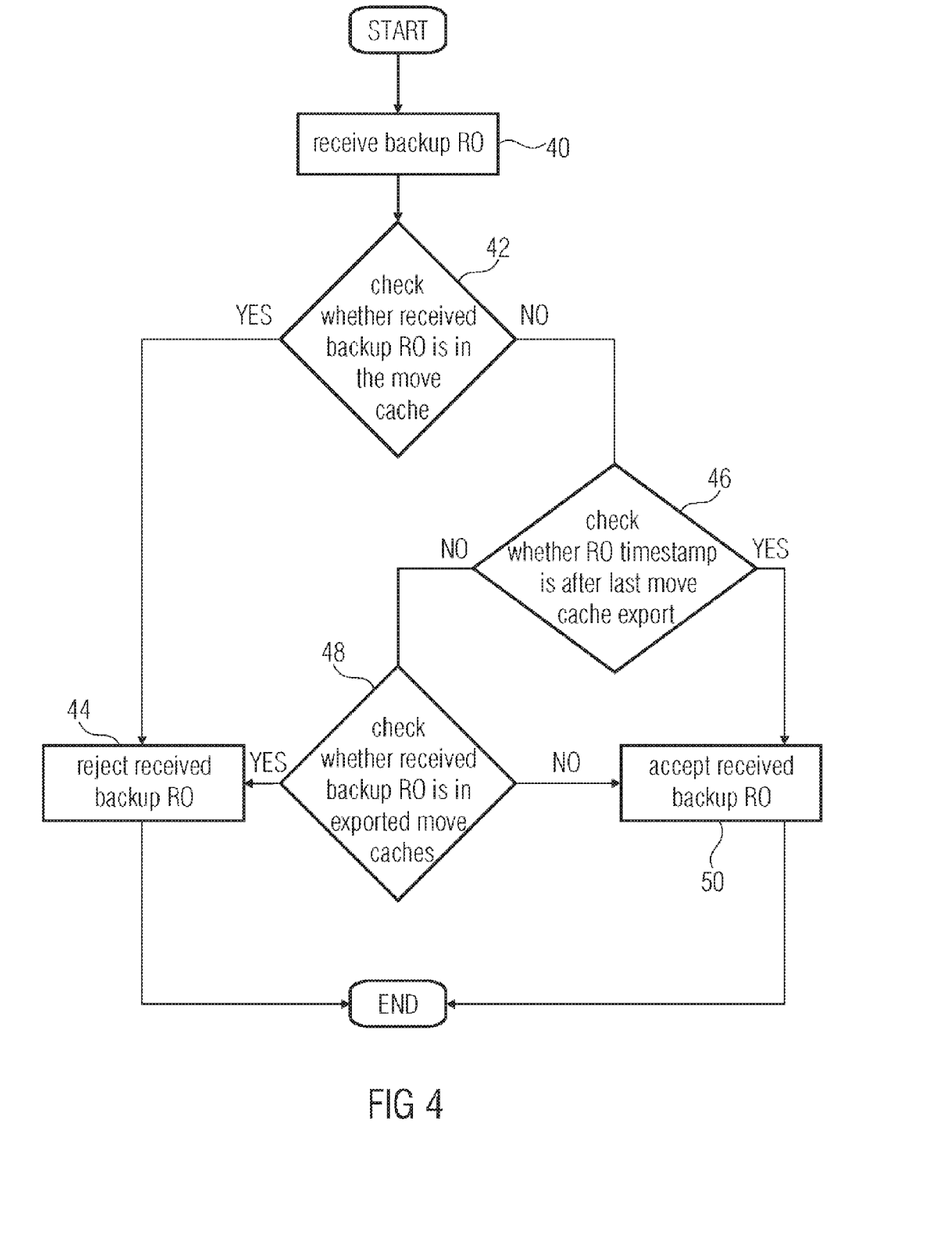
FIG. 4 shows a flowchart of a digital rights management method according to an embodiment of the present invention.

Before explaining embodiments of the present invention in more detail with reference to FIGS. 2 to 4, an attack scenario, which occurs when both move and backup for the same rights object are allowed, shall be explained referring to FIGS. 1a to c.

FIG. 1a shows a DRM device 10 having installed thereon a rights object 12 comprising permissions linked to a digital media object 14. In the scenario depicted in FIG. 1a, a user wants to perform a backup of the rights object 12 by copying the rights object 12 from the DRM device 10 to another medium 16. The medium 16 may, e.g., be an external memory (e.g. secure memory card, smart card) or another DRM capable device. The resulting backup rights object 12' remains cryptographically bound to the originating device 10, such that it can only be restored to and replayed on the originating device 10. Hence, the backup rights object 12' cannot be used to exercise the rights on any other device than the originating device 10.

After the backup procedure depicted in FIG. 1a, the user might want to move the rights object 12 from the originating device 10 to a destination device 18. Before the move of the rights object 12, the rights object 12 is only cryptographically bound to the originating device 10, i.e., only the originating device 10 can exercise the rights in order, for example, to replay a content of the digital media file 14. After the move, the rights object 12 is deleted from the originating device 10 and the moved rights object 12" is only bound to the destination device 18, i.e., only the destination device 18 can exercise the rights in order to also replay a transferred content of a copied digital media object 14'. Via the move operation, the rights in form of the rights object 12 related to the digital media content 14 have been transferred from source device 10 to the destination device 18.

Since a backup version 12' of the rights object 12 exists on the external medium 16, the user could now re-install the backup rights object 12' to the source device 10 by receiving the backup rights object 12' from the external medium 16. In this way, the rights related to the digital media object 14 would have been duplicated, as they now exist on source device 10 and destination device 18.

Such an abuse of the rights object 12 is not wanted by content providers. Therefore, a straightforward solution would be to not allow a move for the rights object 12 of which a backup copy 12' has already been made. However, this would put serious restrictions on user flexibility.

To circumvent this tension between protecting content and providing flexibility, embodiments of the present invention provide a device 20 capable of digital rights management, which is schematically shown in FIG. 2.

The DRM device 20 comprises a memory area 22 for storing information on a rights object that has been transferred from the DRM device 20 to another DRM device (not shown), wherein the rights object comprises permissions linked to an associated digital media object. Further, the DRM device 20 comprises a processor 24 for receiving a rights object, wherein the processor 24 is operative to access the memory area 22 to check whether information on the received rights object is stored in the memory area 22 and to set up the received rights object on the DRM device 20 in case the information on the received rights object is not stored in the memory area 22, and to reject the received rights object in case the information on the received rights object is stored in the memory area 22.

As has been explained before, the memory area 22 corresponds to the move cache.

Examples of the DRM device 20 include personal computers, laptop computers, personal digital systems, mobile telephones, media players, work stations, file servers, mainframes, etc. The DRM device 20 could also be a removable component, such as a removable media card or one of the aforementioned devices. Of course, the DRM device 20 can also be a combination of the aforementioned devices.

The DRM device 20 can communicate with other devices directly or via a network. The network may be any network that allows separate devices 20 to communicate, i.e., e.g., a local area network (LAN), a wide area network (WAN), a wireless LAN, a wireless WAN, the Internet, a wireless telephone network, etc. Different devices may communicate with each other and to the network through landlines (e.g. T1, DSL, Cable, POTS) or wireless technology (e.g. Bluetooth, WLAN, WiFi, etc.). Of course, the communication between different devices 20 can either be secure or non-secure.

Since the information on the rights object that has been transferred from the DRM device 20 should also reside in the move cache 22 when switching off the DRM device 20, the move cache 22 is advantageously a part of a non-volatile memory area 26 of the DRM device 20. Examples of non-volatile memory include read-only memory, flash memory, most types of magnetic computer storage devices (e.g. hard disks, floppy disk drives, and magnetic tape), optical disc drives, etc.

To prevent that the move cache 22 requires a huge amount of memory, the move cache 22 may keep only a small amount of information on rights objects that have been transferred from the device 20 rather than the complete rights objects. This small amount of information may be e.g. a piece of a cryptographic hash over a complete rights object, respectively, the piece of the cryptographic hash subsequently being called rights object hash. Thereby, a hash generally denotes a result of a hash function applied to the complete rights object. A hash function is a reproducible method of turning some kind of data into a (relatively small) number that may serve as a digital fingerprint of the data (here: the rights object). The hash function chops and mixes (i.e. substitutes or transposes) the data to create such fingerprints. The fingerprints are called hash sums, hash values, hash codes or simply hashes. According to an embodiment of the present invention, the first six bytes of a SHA-1 hash may be used as the rights object hash. Of course, other parts and/or other hashes are also conceivable. However, it is important to choose a size of a rights object hash such that it is very improbable that two different rights objects result in the same rights object hash.

Hence, according to embodiments of the present invention, the move cache 22 is configured to store information on the rights object that uniquely identifies the rights object among a plurality of rights objects. Likewise, the processor 24 may be configured to generate said unique information. That is, if the move cache 22 is configured to store at least a part of a cryptographic hash over the entire rights object as the information on the rights object, the processor 24 is configured to generate at least the part of the cryptographic hash.

The non-volatile memory area 26 in which the move cache 22 for storing the rights object information resides may be an unprotected memory. The move cache 22 should be large enough such that it can store a sufficient amount of rights object hashes, i.e., that it allows the moving of a sufficient number of rights objects. However, if the move cache 22 exhausts, embodiments of the present invention provide for storing the move cache 22 or at least parts thereof on another (unprotected) medium (not shown), which is indicated by the arrow 27. This external storing is called export from move cache 22. When an export from the move cache 22 happens, the move cache 22 in the DRM device 20 may only keep a cryptographic hash or a part of a cryptographic hash over the part of the move cache 22 that was exported and the point in time on which the export happened. This point in time, called exported move cache timestamp, may also be stored in the exported move cache.

The hash over the move cache 22 and/or the part of the move cache that was exported may be determined in block 28 and stored in a protected memory area 30, according to embodiments of the present invention. By storing the hash over the exported move cache or at least parts thereof in the protected memory area 30, a compromise of the exported memory move cache may be detected.

If the DRM device 20 receives a rights object, which may be a backup rights object, via input/output port 32, the processor 24 checks as to whether information on the received rights object is stored in the move cache 22. If so, a rights object equal to the received rights object has been previously moved or transferred from the DRM device 20 and, therefore, the received (backup) rights object is not set up on the DRM device 20. If, however, information on the received rights object cannot be found in the move cache 22 and the rights object timestamp (value of the "timestamp" field in the rights object payload) indicates a value after a last export of the move cache 22, the received rights object is accepted and set up on the DRM device 20. If the rights object timestamp is before the last export of move cache 22, the processor 24 checks the exported move caches from the most recent one to older ones until it finds information on the received rights object or until the timestamp of the exported move cache is earlier than the rights object's timestamp. If information on the received rights object is not found in any move caches, including the exported move caches, the received rights object may be accepted and installed on the DRM device 20.

A schematic structure of the move cache 22 for storing information on rights objects that have been moved from the DRM device 20 to another DRM device is shown in FIG. 3.

As can be seen, the move cache 22 includes memory fields 34-1 to 34-N, each storing information on a rights object that has been previously transferred from the DRM device 20, e.g. for the purpose of a backup. As explained above, the stored information on the rights object may be a part of a hash over the complete rights object, respectively. Further, the move cache 22 comprises memory fields 36-1 to 36-M for storing information on exported versions of the move cache 22. FIG. 3 also shows the structure of an exported version of the move cache 38 principally having the same structure as the move cache 22. The information over the exported versions of the move cache may include the hash over the exported versions, respectively, and a pointer to a memory location as to where to find the respective exported move cache version. As mentioned above, the exported move cache versions 38 may reside in an unprotected memory area. However, the information 36-1 to 36-M on the exported move cache versions should reside in a protected memory area. Protection of memory can be achieved via different means. Memory protection can be achieved by cryptographic software algorithms or by hardware modifications. In any case, protection here means that the regarded memory area should be attack-secure.

If exporting the move cache 22 occurs frequently, an exported move cache file may comprise cryptographic hashes of one or more former exported move cache files as it is indicated by reference numeral 39 in FIG. 3. In this way, the DRM device 20 only needs to store a limited amount of hashes over exported move caches and can rely on the exported move caches 38 to verify a hash of some other previously exported move cache. This prevents the filling of the move cache 22 on the DRM device 20 with hashes over exported move caches and in fact allows unlimited moving.

Filling of the move cache 22 may be done in sequential order from a first entry to a last entry of the move cache. If the last entry is occupied, the DRM device 20 may request to export the move cache 22 and then starts again at the first entry by removing rights object hashes already stored only when a new rights object hash is to be stored. This prevents that the DRM device 20 has to request for exported move caches immediately after an export.

According to a further embodiment of the present invention, the move cache 22 may also be used to allow a backup of stateful rights objects. In order to prevent that stateful rights are re-exercised, the move cache 22 may also comprise state information of stateful rights objects. When a stateful backup rights object is to be installed on the DRM device 20, the processor 24 may collect the state information from the move cache 22 or exported move caches 38 such that a user can exercise only the rights that he is still entitled to use.

The inventive method that is executed by the DRM device 20 is summarized by the flowchart depicted in FIG. 4.

The method comprises a step 40 of receiving a rights object, which might be a backup rights object. After receiving the rights object, processor 24 checks in a step 42 as to whether information on the received rights object is stored in the move cache 22. If the information on the received rights object is found in the move cache 22, the received rights object is rejected in a following step 44. However, if the information on the received rights object is not found in the move cache 22, the processor 24 further checks in a step 46 as to whether a timestamp of the received rights object is after the last export of the move cache 22. If this question is answered with "YES", the processor 24 accepts the received rights object for installation of the DRM device 20 in step 50. However, if question of step 46 is answered with "NO", the processor 24 further checks in step 48 as to whether the information on the received rights object may be found in one of the previously exported move caches. If this is the case, a version of the received rights object has been previously moved from the DRM device 20, such that a re-installation is rejected by the processor 24 in step 44. However, if the information on the received rights object is also not found in any of the previously exported move caches, the DRM device 20 or the processor 24 accepts the received rights object for installation on the device 20 in step 50.

Hence, the processor 24 is adapted to access the exported move cache 38, in case the information on the received rights object is not found in the move cache 22, to check whether the information on the received rights object is stored in the exported move cache 38. For this purpose the processor 24 is adapted to compare the timestamp of the received rights object with time information on the time when the last export of the move cache took place in step 46 before accessing the exported move cache in step 48. In particular, the processor 24 is adapted to only access the exported move cache in case the timestamp of the received rights object indicates an issuance of the received rights object before the time when the last export of the move cache took place.

To summarize the concept of the present invention, a special memory area 22, which may be seen as a move cache, is proposed. This move cash is embedded in the DRM device 20 and keeps track of all moves of rights objects that occur from the device 20. Before a received (backup) rights object is restored or re-installed on the device, the device 20 checks if information on the received rights object is stored in the move cache. If it is not, it may be concluded that the received rights object has not been previously moved to another device, and as a consequence the device 20 may restore or re-install the backup rights object. However, if information on the received rights object is found in the move cache or exported versions thereof (i.e., the rights object has been moved), it may not be restored or re-installed on the device 20.

To prevent rights that have been moved from being re-installed with a replay attack or by restore from off-device storage, an inventive device 20 has a move cache 22 with a reliable identification for all stateless rights objects that have been moved e.g. to a SRM. This identification may be denoted as Global Unique Identifier (GUID). However, a reduced size rights object identification may be used, such as the hash over the rights object container, e.g. truncated to a minimum size of 6 bytes. The move cache may also hold the <timeStamp> element (RITS) of the rights object.

Immediately after the rights are removed during a successful move of a stateless rights object from the device 20 to an SRM, the processor 24 (DRM Agent) may insert the <GUID, RITS> pair corresponding to the rights object in the move cache 22.

If a <GUID, RITS> pair is to be inserted in the move cache 22, but the move cache is full and the RITS in the rights object is later than the earliest RITS in the move cache 22, then the processor 24 may replace the entry with the earliest RITS in the move cache 22 with the new <GUID, RITS> pair. If the RITS in the rights object is equal to or earlier than the earliest RITS in the move cache, the <GUID, RITS> pair is not inserted.

When receiving a stateless rights object (RO) in a way other than move (e.g. when restoring a backup from off-device storage), the processor 24 may perform the following procedure:
a) Check if the move cache contains the GUID of the received RO. If it does, then a) holds, otherwise a) fails.
b) If a) holds, the RO is rejected.
c) If a) fails and the move cache is not full, the RO is installed.
d) If a) fails, the move cache is full and the RITS of the RO is after the earliest RITS in the move cache, the RO is installed.
e) If a) fails, the move cache is full and the RITS of the RO is earlier than or equal to the earliest RITS in the move cache, the RO is rejected.

Multiple copies of the same rights object (i.e. two rights objects having the same ROID) shall not be installed simultaneously on the same device. Disabled rights objects (e.g. during a rights object upload or move protocol) are considered as installed, i.e. when a rights object is disabled, another copy of it should not be installed.

When a stateless rights object is moved from an SRM to the device 20, and its <GUID, RITS> pair is already in the move cache 22, then this <GUID, RITS> pair should be removed from the move cache 22. Notice that this happens when a stateless rights object is moved from the device to the SRM, and later returns to the same device via a move operation.

When the move cache 22 is full, the device 20 may store a part with the oldest RITS values of the move cache on off-device storage. In this case, the device 20 should provide for integrity protection of the externally stored part. Additionally, the device 20 should record securely that and when it stored a part of the move cache on external storage and an identification of the latest externally stored part. When a rights object with a RITS before the time on which the last export took place is delivered out-of-band or re-installed from off-device storage, and the move cache 22 does not indicate that the rights object has been moved, the device 20 should also request the externally stored part of the move cache, verify its integrity, verify that it is the latest externally stored part and verify if the rights object has been moved. If the integrity verification of the externally stored part fails, or if the externally stored part indicates that the rights object has been moved, the rights object should not be installed. If the move cache 22 indicates that the rights object has been moved, the rights object should not be installed. Otherwise the rights object is installed. If a rights object with a RITS equal to the time on which the last export took place is delivered out-of-band or restored from a backup, both the move cache and the externally stored part should be consulted.

Embodiments of the present invention allow the use of both move and backup of rights in the OMA DRM family, but avoids the danger of duplicating the rights. This may increase user experience and user acceptance, since a backup of rights does not lead to any restrictions. Due to its flexibility, safety and performance, the present invention is particularly suitable for DRM applications.

Depending on the circumstances, the inventive DRM method may be implemented in hardware or in software. The implementation may be done on a digital storage medium, particularly a disc, a DVD or a CD with electronically readable control signals, which may co-operate with a programmable computer system such that the method is executed. In general, the invention also consists in a computer program product with a program code stored on a machine-readable carrier for performing the inventive method when the computer program product runs on a computer and/or microcontroller. In other words, the invention may, thus, be realized as a computer program with a program code for performing the method when a computer program runs on a computer and/or microcontroller.

While this invention has been described in terms of several embodiments, there are alterations, permeations and equivalents, which fall within the scope of this invention. It should also be noted that there are many alternative ways of implementing the methods and compositions of the present invention. It is therefore intended that the following appended claims be interpreted as including all such alterations, permutations and equivalents as falling within the true spirit and scope of the present invention.

The invention claim is:

1. A digital right management (DRM) device, the device comprising:
   a memory area that stores information on at least one first rights object that has been moved from the DRM device to another DRM device after which only the another DRM device is capable of exercising rights of the at least one first rights object, wherein the at least one first rights object comprises permissions linked to a digital media object; and
   a processor programmed or configured to receive a second rights object, wherein the processor is programmed or configured to access the memory area to check whether information on the second rights object is stored in the memory area and to set up the second rights object on the digital right management device in case the information on the second rights object is not stored in the memory area and to reject the second rights object in case the information on the second rights object is stored in the memory area;
   wherein the at least one first rights object is only cryptographically bound to the DRM device before the at least one first rights object is moved to the another DRM device, such that only the DRM device can exercise the rights of the at least one first rights object before the at least one first rights object is moved to the another DRM device,
   wherein the at least one first rights object is deleted from the DRM device after the at least one first rights object is moved to the another DRM device,
   wherein the at least one first rights object is only bound to the another DRM device after the at least one first rights object is moved to the another DRM device, such that only the another DRM device can exercise the rights of the at least one rights object after the at least one first rights object is moved to the another DRM device,
   wherein the rights of the at least one first rights object are related to digital media content,
   wherein the device is configured to export stored information from the at least one first rights object from the memory area to an additional memory area, and to access the additional memory area, and
   wherein the processor is programmed or configured to compare a timestamp of the second rights object with the time information on the time when the last export took place before accessing the additional memory area, and to only access the additional memory area in case the timestamp of the second rights object indicates an issuance of the second rights object before the time when the last export took place.

2. The device according to claim 1, wherein the memory area stores information on the at least one first rights object that uniquely identifies the at least one first rights object among a plurality of rights objects.

3. The device according to claim 1, wherein the memory area stores at least a part of a cryptographic hash over the entire at least one first rights object as the information on the at least one first rights object.

4. The device according to claim 1, wherein the memory area comprises an attack-secure memory region to store a cryptographic hash over the memory area in the attack-secure memory region.

5. The device according to claim 1, wherein the device is configured to export stored information from the at least one first rights object from the memory area to the additional memory area in case a storage capacity of the memory area is reached.

6. The device according to claim 5, wherein the memory area stores time information on a time when a last export took place.

7. The device according to claim 5, wherein the processor is programmed or configured to access the additional memory area, in case the information on the second rights object is not found in the memory area, to check whether the information on the second rights object is stored in the additional memory area.

8. The device according to claim 1, wherein the memory area stores state information of a stateful rights object as a part of the stored information on the at least one first rights object.

9. The device according to claim 8, wherein the processor is programmed or configured to, in case information on the second rights object is stored in the memory area, compare state information of the second rights object with stored state information related to moved rights objects.

10. The device according to claim 1, wherein the device is a OMA DRM compliant device.

11. The device according to claim 10, wherein the device is a OMA DRM compliant secure removable media device.

12. A digital rights management (DRM) method, comprising:
   storing information on at least one first rights object in a memory area of a first device, wherein the at least one first rights object has been moved from the first device to a second device after which only the second device is capable of exercising rights of the least one first rights object, and wherein the at least one first rights object comprises permissions linked to a digital media object;
   receiving a second rights object at the first device; and
   accessing the memory area to check whether information on the second rights object is stored in the memory area and to set up the second rights object on the first device in case the information on the second rights object is not stored in the memory area, and to reject the second rights object in case the information on the second rights object is stored in the memory area;
   wherein the at least one first rights object is only cryptographically bound to the first device before the at least one first rights object is moved to the second device, such that only the first device can exercise the rights of the at least one first rights object before the at least one first rights object is moved to the second device,
   wherein the at least one first rights object is deleted from the first device after the at least one first rights object is moved to the second device,
   wherein the at least one first rights object is only bound to the second device after the at least one first rights object is moved to the second device, such that only the second device can exercise the rights of the at least one rights object after the at least one first rights object is moved to the second device, wherein the rights of the at least one first rights object are related to digital media Content, wherein the method further includes exporting stored information from the at least one first rights object from the memory area to an additional memory area, and accessing the additional memory area, and wherein the method further includes comparing a timestamp of the second rights object with the time information on the time when the last export took place before accessing the additional memory area, and only accessing the additional memory area in case the timestamp of the second rights object indicates an issuance of the second rights object before the time when the last export took place.

13. The method according to claim 12, wherein storing the information comprises storing information on the at least one first rights object that uniquely identifies the at least one first rights object among a plurality of rights objects.

14. The method according to claim 12, wherein storing the information comprises storing at least a part of a cryptographic hash over the entire at least one first rights object as the information on the at least one first rights object.

15. The method according to claim 12, wherein storing the information comprises storing a cryptographic hash over the memory area in the attack-secure memory region.

16. The method according to claim 12, wherein storing the information comprises storing stored information from the at least one first rights object in an additional memory area in case a storage capacity of the memory area is reached.

17. The method according to claim 16, wherein storing the information comprises storing information on a time when a last storage in the additional memory area took place.

18. The method according to claim 12, wherein storing the information comprises storing state information of a stateful rights object as a part of the stored information on the at least one first rights object.

19. The method according to claim 18, wherein checking whether information on the second rights object is stored in the memory area comprises comparing state information of the second rights object with stored state information related to moved rights objects.

20. A non-transitory computer readable medium including a computer program comprising a program code for performing, when run on a computer and/or a microcontroller, a digital rights management method comprising:

storing information on at least one first rights object in a memory area, wherein the at least one first rights object has been moved from a first device to a second device after which only the second device is capable of exercising rights of the least one first rights object, and wherein the at least one first rights object comprises permissions linked to a digital media object;

receiving a second rights object at the first device; and accessing the memory area to check whether information on the second rights object is stored in the memory area and to set up the second rights object on the first device in case the information on the second rights object is not stored in the memory area, and to reject the second rights object in case the information on the second rights object is stored in the memory area;

wherein the at least one first rights object is only cryptographically bound to the first device before the at least one first rights object is moved to the second device, such that only the first device can exercise the rights of the at least one first rights object before the at least one first rights object is moved to the second device, wherein the at least one first rights object is deleted from the first device after the at least one first rights object is moved to the second device, wherein the at least one first rights object is only bound to the second device after the at least one first rights object is moved to the second device, such that only the second device can exercise the rights of the at least one rights object after the at least one first rights object is moved to the second device, wherein the rights of the at least one first rights object are related to digital media content, wherein the method further includes exporting stored information from the at least one first rights object from the memory area to an additional memory area, and accessing the additional memory area, and wherein the method further includes comparing a timestamp of the second rights object with the time information on the time when the last export took place before accessing the additional memory area, and only accessing the additional memory area in case the timestamp of the second rights object indicates an issuance of the second rights object before the time when the last export took place.

* * * * *